United States Patent Office 3,417,030
Patented Dec. 17, 1968

3,417,030
HIGH SURFACE AREA ALUMINA AND
CATALYST COMPOSITE
Mark J. O'Hara, Prospect Heights, and William K. T. Gleim, Island Lake, Ill., assignors to Universal Oil Products Company, Des Plaines, Ill., a corporation of Delaware
No Drawing. Filed Feb. 23, 1966, Ser. No. 529,272
9 Claims. (Cl. 252—455)

ABSTRACT OF THE DISCLOSURE

Preparation of high surface area alumina by heating an aluminum alkoxide at a temperature intermediate its melting and boiling points in an oxygen-containing atmosphere to form an alumina hydrate and calcining the alumina hydrate thus formed.

---

In broad scope, the present invention relates to the preparation of refractory inorganic oxide material, and particularly to a novel method for preparing alumina. More specifically, there is described herein a method for the preparation of alumina possessing an unusually high surface area, generally above 400 square meters per gram, and often greater than 450 square meters per gram, and simultaneously having suitable pore volume and pore diameter characteristics.

Alumina, either existing in one of its many hydrated forms, or as anhydrous aluminum oxide, is extensively utilized within the petroleum and chemical industries. Alumina enjoys considerable use in the petroleum industry as a catalytic agent for hydrocarbon conversion processes, as a support or carrier material for a wide variety of catalytically active metallic components to be employed in hydrocarbon conversion processes, and as a dehydrating agent. Alumina is widely employed in a multitude of areas within the chemical industries for virtually the same purposes. Activated forms of alumina, considered to be modifications of aluminum oxide, or its hydrates, are especially known for their pronounced catalytic activity and adsorbtive capacity. The use of alumina as a refractory material is also well-known. When in the form of corundum, alumina has been found suitable for use in the manufacture of certain ceramic materials. For its many other uses, alumina is mixed or blended with other inorganic oxides to produce desired composites having a variety of modified physical and/or chemical properties.

Just as the precise chemical composition of alumina can vary within wide limits, the physical properties thereof can also be selected within a considerably large range. The physical properties of alumina most often considered, in determining the intended use thereof, are the surface area expressed in square meters per gram, the pore volume expressed as cubic centimeters per gram, the pore diameter expressed as angstrom units, and the apparent bulk density expressed as grams per cubic centimeter. In most applications for which the alumina is intended, the precise physical properties will be largely dependent upon the particular use. That is, some uses of alumina will require low surface area accompanied by a relatively high apparent bulk density, while others require the opposite of a comparatively high surface area, accompanied by a relatively low apparent bulk density. An object of the present invention is to produce high surface area alumina, the other physical properties of which give rise to ideal application thereof for those uses where high surface area is the dominant factor to be considered.

Through the utilization of the method of preparation, encompassed by the present invention, the resulting alumina will have physical properties which indicate a surface area exceeding 400 square meters per gram, and often above 450 square meters per gram, a pore volume of about 0.45 to about 0.55 cubic centimeter per gram, a pore diameter of from about 40 to about 50 angstrom units and an apparent bulk density ranging from about 0.35 to about 0.45 gram per cubic centimeters.

Although the primary utilization of alumina having a surface area in excess of about 400 square meters per gram, is due to its excellent absorptive capacity, the high surface area alumina produced by the method of the present invention affords significant advantages when utilized in the carrier material for catalytically active metallic components. Thus, although the high surface area alumina of the present invention is ideally suitable for utilization as a drying, treating, or absorbing medium, particularly as the carrier in the preparation of high surface sodium, unusual benefits are afforded, as hereinafter indicated, when utilized as an integral component of the carrier material in the preparation of a catalytic composite for utilization in a process for hydrorefining various hydrocarbonaceous charge stocks.

Therefore, in a broad embodiment, the present invention affords a method of preparing high surface area alumina, which method comprises heating an aluminum alkoxide at a temperature above its melting point, in an oxygen-containing atmosphere and for a time sufficient to form an alumina hydrate, thereafter calcining said alumina hydrate and recovering high surface area alumina.

This particular method is further characterized in that the aluminum alkoxide is heated at a temperature intermediate its melting and boiling points, and the calcination of the resulting alumina hydrate is carried out at a temperature within the range of from about 400° C. to about 700° C. The preferred aluminum alkoxides, utilized to form the alumina hydrate, are characterized by an alkyl group preferably containing from 2 to 4 carbon atoms, and, therefore, are selected from the group consisting of aluminum ethoxide, aluminum iso- and n-butoxides, and aluminum isopropoxide.

As hereinbefore set forth, the high surface alumina may be advantageously utilized in the preparation of catalytic composites, and particularly a catalytic composite having a dual-function; that is, for example, a catalyst possessing both hydrocracking and hydrogenation activities. Therefore, another embodiment of the present invention relates to a catalytic composite prepared by commingling silica and an alumina alkoxide, heating the mixture at a temperature above the melting point of said alkoxide, in an oxygen-containing atmosphere, and for a time sufficient to form an alumina hydrate, thereafter calcining said mixture and combining therewith at least one metallic component selected from the metals of Groups VI–B and VIII, and compounds thereof.

This catalytic composite is further characterized in that the silica-alumina composite, resulting from the calcination of the silica-alumina hydrate mixture, is combined with one or more metals selected from the group consisting of chromium, tungsten, molybdenum, iron, cobalt, nickel, platinum, palladium, rhodium, ruthenium, osmium, and iridium. The particularly preferred hydrorefining/hydrocracking catalyst utilizes at least two metallic components selected from Group VI–B and the iron-group. Thus, for example, the silica-alumina material will be combined with the following: molybdenum and nickel; molybdenum, nickel and cobalt; nickel and tungsten; etc. The Group VI–B metallic component will be present in an amount within the range of about 4.0% to about 30.0% by weight, calculated as the elemental metal, and most often in an intermediate concentration of from about 10.0% to about 20.0% by weight. The iron-group metal will be present in lower quantities, and generally within the range of from about 1.0% to about 6.0% by weight. One such catalytic composite will, therefore, consist of a composite of silica and alumina, containing 63.0% by weight of alumina and 37.0% by weight of silica, with which is combined from about 4.0% to about 30.0% by weight of molybdenum and from about 1.0% to about 6.0% by weight of nickel, being calculated as the elemental metals.

When the present invention is utilized in the preparation of such a catalytic composite, a convenient method involves initially admixing the requisite quantities of a silica hydrogel and an aluminum alkoxide, such as aluminum isopropoxide. The mixture is then heated, in an oxygen-containing atmosphere such as air at a temperature above the melting point of the selected aluminum alkoxide, in this case 118° C., the melting point of aluminum isopropoxide. An essential feature resides in the upper temperature limitations during the decomposition of the aluminum alkoxide within the silica hydrogel. In the case of aluminum ethoxide, the temperature will be maintained within the range of from about 155° C. to about 200° C.; in the case of aluminum isopropoxide, the temperature will be from about 118° C. to about 140° C.; and, when aluminum butoxide is employed, the temperature will be within the range of from about 101.5° to about 300° C. The heating in the oxygen-containing atmosphere is continued until such time as the aluminum alkoxide has formed an alumina hydrate within the silica hydrogel. The formation of the alumina hydrate is complete when there no longer is an evolution of gas from the conversion of the alkoxide to the hydrate of alumina. The resulting mixture will then be formed into the desired size and/or shape, following which it is subjected to a calcination technique at a temperature within the range of from about 400° C. to about 700° C., and combined with the various catalytically active components. It is understood that the particular means utilized in combining the alumina-silica composite with the catalytically active components is not limiting upon the broad scope of the present invention as defined by the appended claims. However, a suitably convenient method involves the utilization of impregnating techniques wherein water-soluble compounds of the desired metals are caused to penetrate within and throughout the carrier material particles, generally evaporated to dryness at a temperature of about 250° F., and thereafter subjected to another calcination technique at a temperature of from about 900° F. to about 1100° F. Suitable water-soluble compounds include nickel nitrate hexahydrate, chloroplatinic acid, ammonium molybdate, molybdic acid, cobaltous chloride, etc. The quantity of the water-soluble compound employed in the impregnating solution is dependent upon the desired concentration of the active metallic component within the final catalyst. It is understood that regardless of the state of the active components within the catalyst, whether combined as the oxide, sulfide, nitrate, or in a most reduced state, the concentrations thereof are computed as if existing therein as the elemental metal.

The following examples are herein presented to illustrate the method by which the high surface area alumina is prepared from an aluminum alkoxide, and the utilization thereof, in combination with silica, in the formation of a dual-function catalytic composite. It is not intended that the present invention be unduly limited to the precise conditions of preparation, the reagents, concentrations, catalytically active metalic components, etc.

EXAMPLE I

An ammonium hydroxide solution (28.0%) was added to an aluminum chloride hydrosol having an aluminum to chloride weight ratio of about 1.25:1. The resulting precipitate was subjected to alternating filtration and water-washing techniques to remove excess chloride ions, and subsequently spray dried, calcination being effected at about 1100° F. The final alumina particles, of about 5-10 micron diameter, indicated physical properties of a surface area of 318 square meters per gram, an average pore volume of 0.69 cc./gm. and an average pore diameter of 77° A.

Aluminum isopropoxide was heated in air at a temperature of 121° C., for a period of time sufficient to effect decomposition to an alumina hydrate. The hydrate was then calcined in a muffle furnace at a temperature of 500° C. for a period of about two hours. The resulting alumina, in powdered form, indicated a surface area of 463 square meters per gram, an average pore volume of 0.51 cc./gm. and an average pore diameter of 44° A., the apparent bulk density being about 0.40 gram/cc.

Aluminum butoxide is heated in air at a temperature of 105° C. for a period of about three hours, to produce an alumina hydrate. The hydrate is formed into cylindrical pills of about ⅛-inch in length and having a nominal diameter of ⅛-inch. The pills are transferred into a muffle oven and heated slowly (about 100° C. increase in a one-half hour period) to a temperature of 500° C., which level is maintained for an additional two hours. The resulting alumina indicates an apparent bulk density of about 0.35 gm./cc., an average pore volume of about 0.60 cc./gm., an average pore diameter of 47° A. and a surface area of about 443 square meters per gram.

The foregoing example was presented to illustrate the method of the present invention for the production of alumina having unusually high surface area, as well as acceptable other physical characteristics. A comparison with other methods for alumina preparation shows an increase in surface area from 100 to 200 square meters per gram.

Example II

This example is for the purpose of illustrating the utilization of the high surface area alumina in the preparation of a catalytic composite, and its subsequent use in a hydrocarbon conversion process. The catalytically active metallic components were molybdenum and nickel, in concentrations within the final composite of 16.0% and 2.0% by weight, respectively. The metallic components were combined with an alumina-silica carrier material, containing 63.0% by weight of alumina, by way of an impregnation technique using the required quantities of nickel nitrate hexahydrate and molybdic acid.

The carrier material, 63.0% alumina and 37.0% silica, was prepared by admixing 100 grams of 20-mesh aluminum isopropoxide with 19 grams of hydrated silica, the mixture being heated in air at a temperature of 149° C. for two hours. The mixture was transferred to a muffle furnace and calcined at a temperature of 649° C. for one hour, and at a temperature of 677° C. for one and one-half hours. The impregnation solution was prepared by commingling 7.7 grams of molybdic acid (85.0% by weight of $MoO_3$), dissolved in 100 ml. of water and 7.0 ml. of ammonium hydroxide, with 2.6 grams of nickel nitrate hexahydrate, dissolved in 2.5 ml. of ammonium hydroxide. The resulting solution was used to impregnate 20.0 grams of the calcined alumina-silica composite, evaporated to dryness and calcined at about 500° C. for a period of about two hours.

It is recognized that the surface area characteristics of the alumina, prepared from the alkoxide, will change when combined with other components. Thus, for example, the above-described composite of 63.0% alumina and 37.0% silica possesses a surface area of 261 square meters per gram, an average pore volume of 0.30 cc./gm. and an average pore diameter of 47° A. Such a result is to be expected since the addition of the silica to the matrix of alumina must necessarily occupy a portion of the void space therein. Significantly, however, the diameter of the pores is not greatly changed, and the decrease in surface area is not nearly as great as occurs with alumina prepared by other methods. In such instances, the surface area of the alumina-silica composite can be decreased to less than 200 square meters per gram, and often to a level which is as low as 150.

This catalyst was employed in processing an atmospheric tower bottoms product having a gravity, °API at 60° F., of 14.3, and containing 3.1% by weight of sulfur and a pentane-insoluble asphaltene fraction in the amount of about 10.9% by weight. 200 grams of this charge stock was admixed with 20.0 grams of the catalyst in an 1800 ml. rocker autoclave, the latter being pressured to 100 atmospheres, which conditions were maintained for a four-hour test period. Following the test period, the contents of the autoclave were cooled, the autoclave depressured, and the normally liquid product separated by centrifugal means. Analyses performed on the liquid product indicated a gravity of 30.8° API at 60° F., a sulfur content of only 0.13% by weight and a pentane-insoluble asphaltene fraction of only 0.45% by weight. Furthermore, following a one-month storage period, there was no indication of sludge formation in the liquid product. A similar test, conducted at a temperature of 402° C. and a final pressure of 198 atmospheres, using an alumina-silica catalyst prepared by coprecipitation from a mixture of the hydrosols thereof, and containing 16.0% molybdenum and 2.0% by weight of nickel, resulted in a liquid product having a gravity of 28.7° API, a sulfur content of 0.18% by weight, and an asphaltenic fraction amounting to 0.27% by weight. Also following a one-month storage period, it was noted that a brownish sludge was forming.

Although both catalysts exhibited acceptable results with respect to sulfur removal and conversion of the pentane-insoluble asphaltenic fraction, it is noted that the catalyst of the present invention possessed a greater activity for the conversion of the charge stock into lower-boiling liquid hydrocarbons. The gravity of the liquid product increased from 14.3 to 30.8, whereas the increase was only to 28.7 with the coprecipitated catalyst; furthermore, the storage characteristics of the former are enhanced over those of the latter.

The foregoing specification and examples indicate the method by which high surface area alumina is produced from an aluminum alkoxide, and the benefits afforded when the alumina is utilized as an integral component of a catalytic composite.

We claim as our invention:

1. A method of preparing high surface area alumina which comprises heating an aluminum alkoxide at a temperature above its melting point and below its boiling point in an oxygen-containing atmosphere and for a time sufficient to form an alumina hydrate, thereafter calcining said alumina hydrate and recovering high surface area alumina.

2. The method of claim 1 further characterized in that said alumina hydrate is calcined at a temperature within the range of 400° C. to about 700° C.

3. The method of claim 1 further characterized in that the alkyl group of said alkoxide contains from two to four carbon atoms.

4. The method of claim 3 further characterized in that said alkoxide is aluminum ethoxide.

5. The method of claim 3 further characterized in that said alkoxide is aluminum butoxide.

6. The method of claim 3 further characterized in that said alkoxide is aluminum isopropoxide.

7. A catalytic composite prepared by commingling silica and an aluminum alkoxide, heating the mixture at a temperature above the melting point and below the boiling point of said alkoxide, in an oxygen-containing atmosphere and for a time sufficient to form alumina hydrate, thereafter calcining said mixture and combining therewith at least one component selected from the metals of Groups VI–B and VIII and compounds thereof.

8. The catalyst of claim 7 further characterized in that said mixture is combined with molybdenum and an iron-group component.

9. The catalyst of claim 8 further characterized in that said molybdenum is combined with from about 1.0% to about 6.0% by weight of nickel.

References Cited

UNITED STATES PATENTS

| | | | |
|---|---|---|---|
| 3,147,208 | 9/1964 | Johnson | 252—458 X |
| 3,217,058 | 11/1965 | Hunt | 23—142 X |
| 3,297,414 | 1/1967 | Mazdiysani et al. | 23—142 X |

DANIEL E. WYMAN, *Primary Examiner.*

CARL F. DEES, *Assistant Examiner.*

U.S. Cl. X.R.

252—458, 459; 23—142